United States Patent

[11] 3,594,097

| [72] | Inventors | Rene Mouille<br>Aix-en-Provence;<br>Charles Tresch, Eguilles; Daniel Mao,<br>Marseille, all of, France |
|---|---|---|
| [21] | Appl. No. | 838,798 |
| [22] | Filed | July 3, 1969 |
| [45] | Patented | July 20, 1971 |
| [73] | Assignee | Sud-Aviation, Societe Nationale De Constructions Aeronautiques<br>Paris, France |
| [32] | Priority | July 11, 1968 |
| [33] | | France |
| [31] | | 158,807 |

[54] VARIABLE PITCH PROPELLER OR ROTOR
2 Claims, 3 Drawing Figs.

[52] U.S. Cl. .................................................. 416/104, 416/134, 416/136
[51] Int. Cl. ....................................................... B63h 1/20, B64c 27/44
[50] Field of Search ............................................ 416/104, 131, 134, 135, 136, 138, 141, 168

[56] References Cited
UNITED STATES PATENTS

| 2,169,849 | 8/1939 | Pitcairn | 416/135 (X) |
| 2,495,434 | 1/1950 | Troller | 416/164 (X) |
| 2,660,461 | 11/1953 | Corby | 416/168 (X) |
| 3,310,119 | 3/1967 | Watson | 416/141 (X) |
| 3,470,962 | 10/1969 | Cure | 416/135 (X) |

FOREIGN PATENTS

| 1,334,843 | 7/1963 | France | 416/136 |
| 1,370,754 | 7/1964 | France | 416/136 |

*Primary Examiner*—Everette A. Powell, Jr.
*Attorney*—Mauro & Lewis

ABSTRACT: The invention is concerned with a root for the blade of a variable pitch rotor, usually the drive torque compensating rotor for a helicopter. The root has a cylindrical portion slidable and rotatable in a plastic sleeve partially embedded in a hub.

VARIABLE PITCH PROPELLER OR ROTOR

This invention relates to a variable pitch propeller or rotor, more particularly a small-diameter faired rotor, of a relatively high speed of rotation, usable, for example, as a fan or a drive torque compensating rotor for a helicopter.

Propellers of this kind, which usually have a large number of blades, are difficult to manufacture because of the behavior of the pitch joint bearings under the action of centrifugal forces and the fact that small control forces are required to vary the pitch.

To obviate these disadvantages, it has already been proposed to mount each blade root on a swivel joint having stops to limit the angular displacement of the blade so that the latter have a certain freedom of position both as regards beat (usually referred to as flap) and drag.

It has also been proposed to replace the pitch joint bearings by a longitudinally elongate and torsionally flexible element which radially connects the blade to the hub and can withstand the centrifugal force. In particular, it is known to make this element from a stack of resilient strips.

It has also been proposed to provide each blade root with a crank pin and produce the pitch variation by means of a plate perpendicular to the propeller axis, axially movable, and connected to each of the crank pins, e.g. by a swivel joint link.

This invention relates to an improvement on the prior art systems, in order to simplify manufacture and more particularly eliminate the link between the control plate and the crank pins while providing operation which requires no lubrication and allows considerable variations in the blade pitch with very small control forces.

According to the invention, the blade root comprises a cylindrical portion sliding and rotating in a sleeve of deformable plastic material which, over part of its length and at the hub axis end, is embedded in the hub and which is free at the outer end, while the periphery of the plate has radial cylindrical housings in which resilient spheroidal rings can slide, rotate and rock, said rings being respectively rigidly secured to each of the crank pins.

A blade root mounting of this type forms a kind of semiembedded fit which allows the blade to perform slight angular beat and drag movements while simultaneously damping such movements. In such a system moreover, the pitch control plate is rotated by the crank pins but the movability and flexibility of the resilient ring in its radial cylindrical housing allows each blade to be swiveled about its longitudinal axis without any jamming and with a small force.

Preferably, the diameter of the cylindrical portion of the blade root is greater than the maximum chord of the blade profile. These cylindrical portions can thus be given the maximum section, i.e. at the place where the end sections of the blade root are substantially tangential to the hub axis end.

The blades are also advantageously solid and made from light metal, the cylindrical blade root being hollow and having a transverse bore extending therethrough for the fastening of the elongate element connecting the blade to the hub.

To provide a greater effective length, the stacks of resilient strips are cut from discs so that the resulting bunches form a plurality of star-shaped arms interconnected at their end at the hub center by a central annular portion of said discs.

This also has the advantage of a substantially nondeformable system as regards the angular spacing of the arms.

The invention will be more readily understood from the following description with reference to the accompanying drawing, which is given by way of nonlimitative example, and the details disclosed in the text and the drawing naturally form part of the invention.

Figure 1:
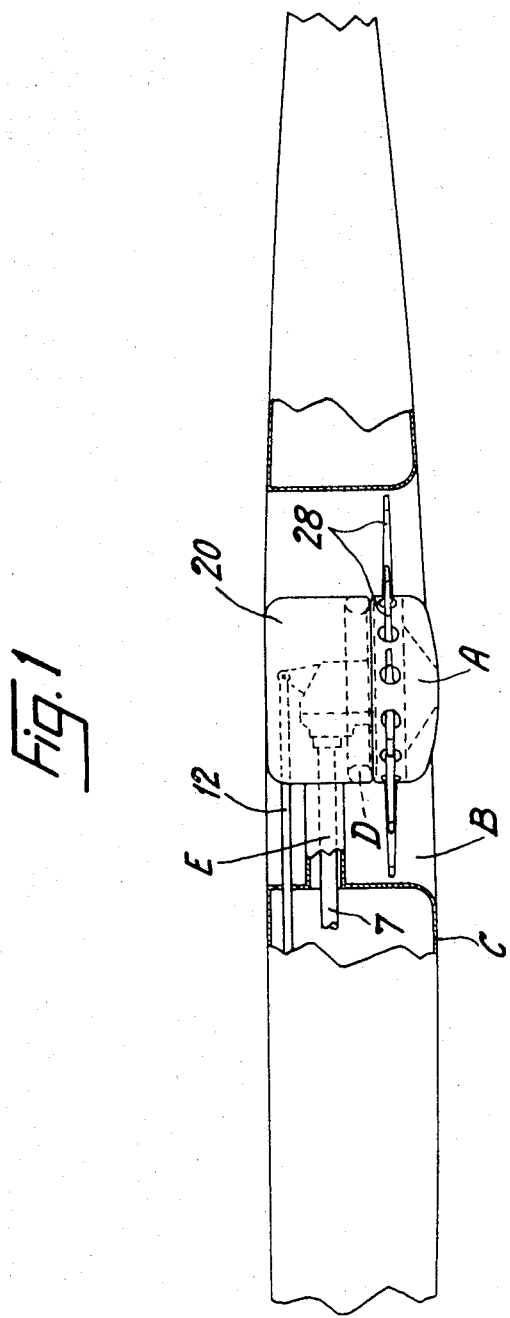
FIG. 1 is a horizontal section of the rear part of a helicopter fuselage provided with an antitorque rotor according to the invention.

The multiblade rotor having the general reference A in FIG. 1 is mounted in a cylindrical fairing B which, in the example illustrated, is an aperture disposed vertically in the rear part of the fuselage or the panelling c of a helicopter, the rotor then being used to compensate the drive torque which is applied mechanically to the main rotor.

In the fairing B the rotor is borne by a central tubular ring D secured to the fairing wall by hollow arms E of streamlined section, one of which acts as a housing for the rotor transmission shaft 7.

Figure 2:
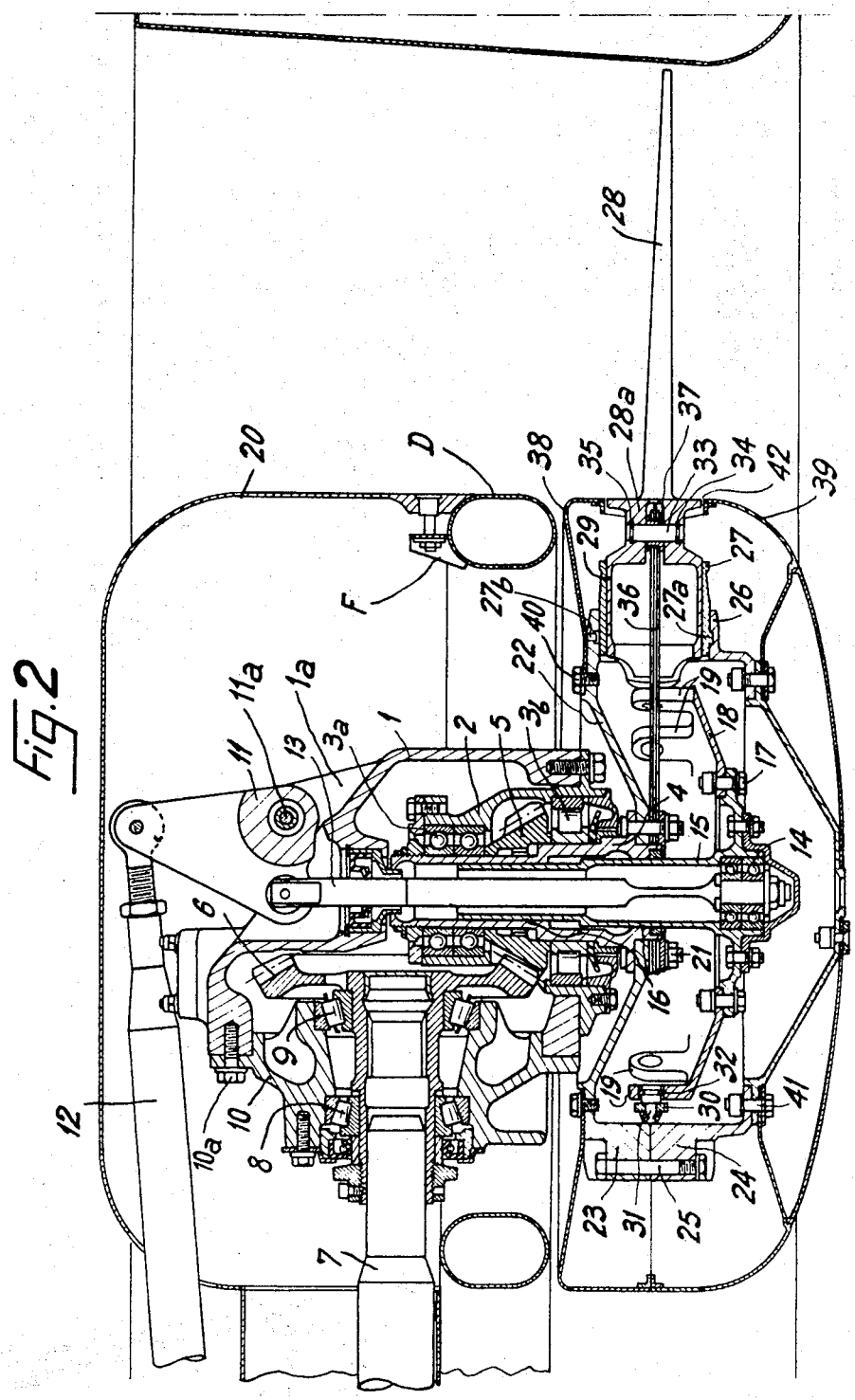
FIG. 2 is an axial section of a rotor hub according to the invention with its drive system and pitch variation control mechanism.
Figure 3:
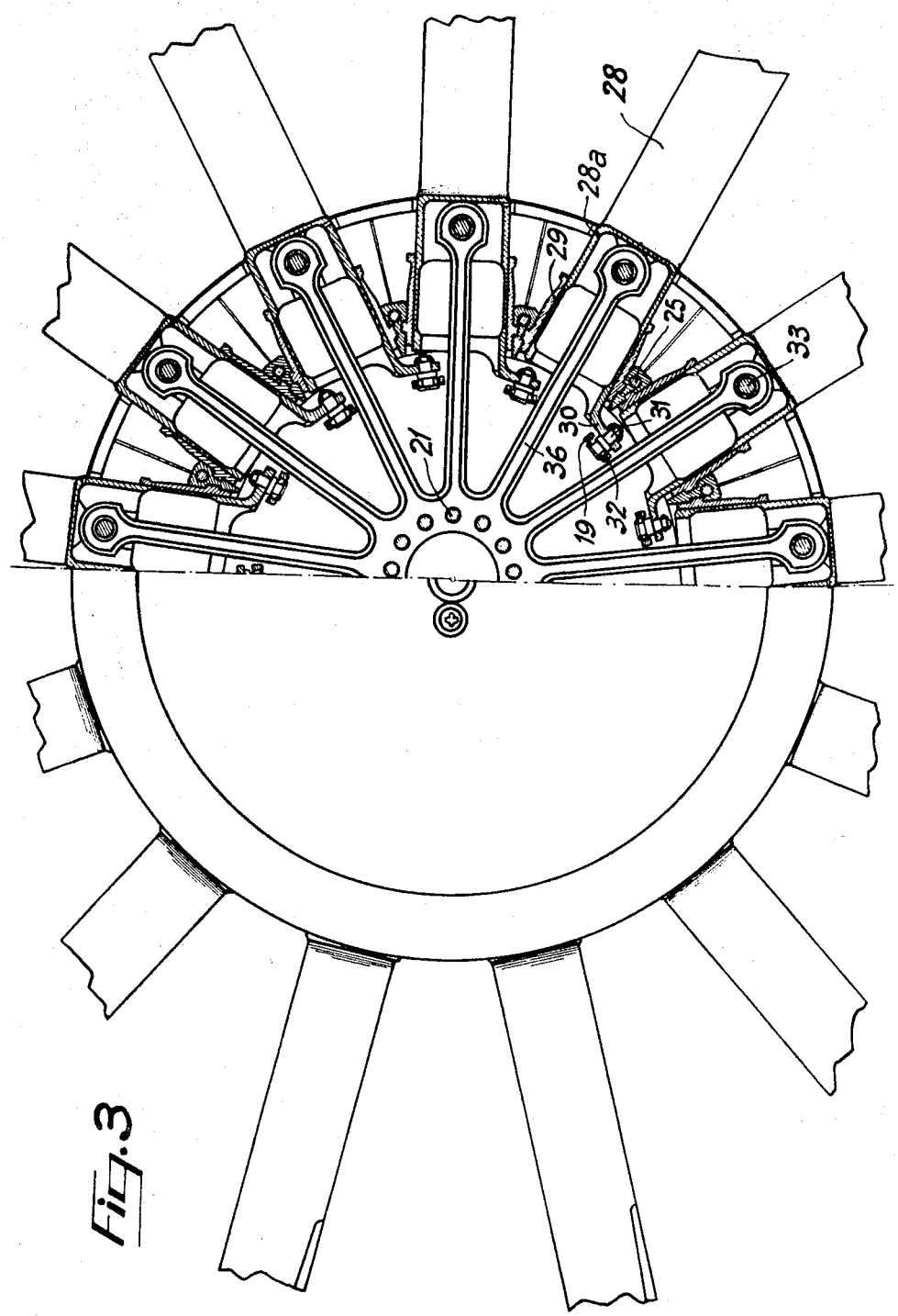
FIG. 3 is a half front view of the rotor hub and a half section in the central plane of the rotor blades.

Lugs, e.g. F(FIG. 2) welded to the ring D support the casing containing the rotor drive and blade pitch control mechanism.

The casing comprises a housing 1 bearing the tubular shaft 4 for the rotor in an attached internal bearing housing 2 on two bearings 3a and 3b which are respectively ball and roller bearings. The drive is provided by bevel gears 5 and 6 respectively secured to the shaft 4 and the drive shaft 7. The shaft 4 and the gear wheel 5 are housed in the bearing housing 2. Gear wheel 6 rotates in two bearings 8 and 9 borne by a bearing housing 10 which is secured to the casing 1 by a ring of bolts 10a.

For control of the propeller pitch, the boss 1a of the housing 1 bears a bevel gear 11 pivotally connected to the spindle 11a, to the arms of which there are respectively connected the pitch control rod 12 and the control shaft 13 which extends axially through the tubular shaft 4 and has at its end a thrust ball bearing connecting with a slide 15 adapted to move longitudinally inside the shaft 4 by the surfaces 16.

At its outer end, the slide 15 has a collar to which bolts 17 secure a control plate which, in the rotor plane, has apertured lugs 19 of a number equal to the number of blades. These lugs extend axially while the apertures 19 extend radially with respect to the rotor axis. The entire mechanism is contained in a cowling 20 secured externally to the casing support ring.

Bolts 21 secure the hub member 22 to the tubular shaft 4, the hub rim consisting of two circular plates 23 and 24 connected at the periphery by bolts 25.

The rim constructed in this way is radially formed with cylindrical bores 26 of a number equal to the number of blades. Each bore accommodates a sleeve 27 of a relatively flexible synthetic material having a low coefficient of friction, e.g. polyamide. This sleeve 27 in which the root of each blade can rotate, projects by approximately half its own length outside the rim so that the outer part can move to some extent.

Each sleeve 27 is held in position by a collar 27a engaging a corresponding groove formed in the bore 26. It is prevented from turning by a pin 27b. Each blade is made in one piece, preferably of light alloy in order to reduce centrifugal forces and comprises: at the outer end, a suitably profiled and possibly twisted solid portion 28 so that its pitch near the root is greater than near the free end. This solid portion forms the body of the blade, whose leading edge at the end third is protected against erosion by suitable surface hardening, e.g. hard anodization. At the root end the blade comprises a hollow part having a transverse bore forming the blade fastening 28a and a cylindrical bearing 29 allowing free rotation in the direction of the longitudinal pitch axis in the sleeve 27. The outer surface of the bearing 29 is advantageously surface-hardened by chromium-plating or anodization. Also, the central part 29a of bearing 29 is of reduced thickness in order to reduce the rotating mass subjected to centrifugal force.

At the inner end the blade has a pitch lever 30 to the end of which a spindle 31 is secured radially in the middle position of the lever, the end of the said spindle bearing a spherical ring 32, preferably of synthetic material, e.g. an elastomer, which fits exactly inside the apertured lug 19 to allow relative movements of the two parts, i.e., a rotation, a slight axial sliding and a slight oscillation of the spindle 31 with respect to the aperture in the lug 19.

The transverse bore in the fastening 28a receives a retaining spindle 33 held in position by two circlips 34 and 35.

The connection between each blade 28 and the rotor shaft 4 is provided by an elongate element 36 passing inside the bearing 29 and secured at the blade end on the spindle 33 by means of a bush 37.

The elongate element 36 transmitting the centrifugal force produced by the rotation of the blades is also capable of longitudinal torsion. In particular it may comprise a plurality of thin strips which are bonded together, the outer strips of the bunch being narrower than the inner strips so that the torsional stresses can be distributed uniformly amongst them. Also, to avoid contact corrosion, the strips are coated with an antifriction plastic. The various elements 36 are rigidly connected at the end adjacent the shaft 4 and form a flat ring which thus comprises a plurality of star-shaped arms of a number equal to the number of blades. This ring is fixed on the end of the shaft 4 by bolts 21 which also secure the hub member 22 there. This star-shaped assembly is produced by superimposing a plurality of discs of thin sheet steel cut out in the form of a star and superposed.

A circular cowling of thin sheet metal formed by the two halves 38 and 39 secured to the hub 22 by screws 40 and 41 respectively encases the hub and control mechanism assembly.

Circular apertures 42 of a diameter slightly greater than the diameter of the blade fastenings 28a are formed at the periphery of this cowling to allow the free passage of the blades.

To provide aerodynamic continuity, the diameter of the cowlings 38 and 39 is identical to that of the cowling 20 covering the drive mechanism.

We claim

1. A variable pitch multiblade propeller comprising a rotary hub having radial bores, the axes of which are in the same plane and evenly spaced around said hub axis; sleeves of plastic material having a cylindrical and antifrictional inner surface, said sleeves being embedded in said bores and outwardly protruding with respect thereof along a distance at least equal to half their own length; a blade, having a hollow cylindrical root fitted in each of said sleeves for sliding and rotation therein; a lever substantially radial with respect to said root, rigidly secured thereto substantially in the root axis plane for the mean position of the blade, said lever having an inwardly directed pin radial with respect to said hub axis; a ring of plastic material having a rounded periphery coaxially secured to said pin; an elongated radial element capable of torsion about its longitudinal axis axially passing through each said hollow blade root and secured to the said hub and to the corresponding blade outwardly with respect to said sleeve; and a rotary plate coaxial to the hub and axially displaceable, said plate having peripheral, axially directed lugs, each lug being provided with a radial cylindrical bore engaging one said plastic ring for sliding, rotating and rocking thereof.

2. A propeller according to claim 1, wherein the diameter of the cylindrical portion of the blade root is greater than the maximum chord of the blade profile.